Nov. 21, 1967 C. J. SEBO 3,353,775
CONDUIT BRACKET

Filed Oct. 19, 1965 2 Sheets-Sheet 1

INVENTOR
CARL J. SEBO

BY
Caesar, Rivise, Bernstein & Cohen
ATTORNEYS.

Nov. 21, 1967 C. J. SEBO 3,353,775
CONDUIT BRACKET
Filed Oct. 19, 1965 2 Sheets-Sheet 2
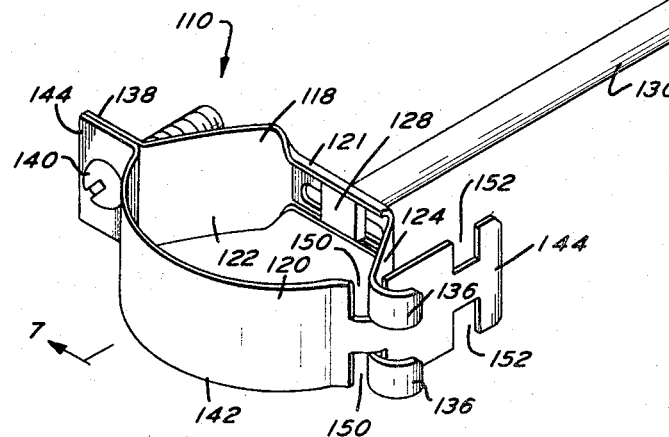
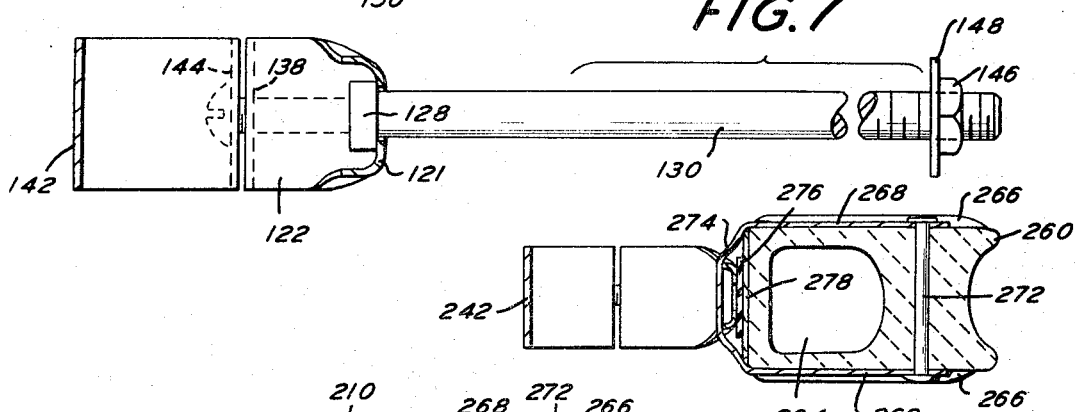
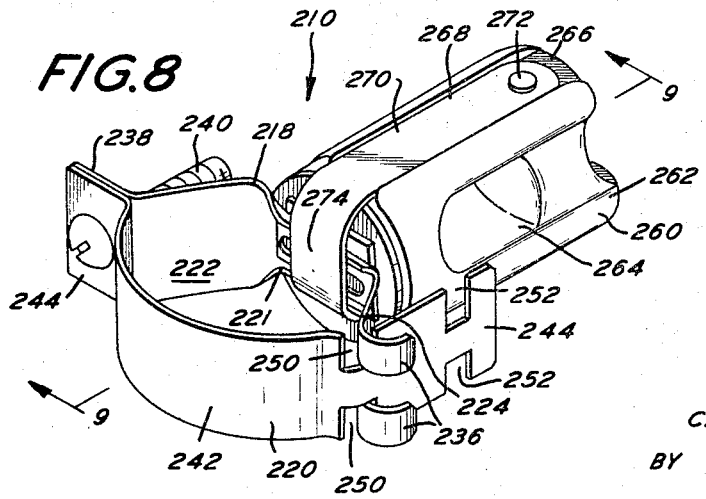
INVENTOR
CARL J. SEBO
BY
Caesar, Rivise, Bernstein & Cohen
ATTORNEYS.

United States Patent Office 3,353,775
Patented Nov. 21, 1967

3,353,775
CONDUIT BRACKET
Carl J. Sebo, Clarks Summit, Pa., assignor to Atlas
Electrical Fittings Co., Scranton, Pa., a corporation of Pennsylvania
Filed Oct. 19, 1965, Ser. No. 498,028
6 Claims. (Cl. 248—70)

ABSTRACT OF THE DISCLOSURE

A conduit bracket for securing a conduit to a wall which comprises a U-shaped base, a clamping section which is pivotably connected to the base and a securing member which extends from the base. The base includes a central section having a slotted opening which permits lateral adjustment of the securing member and a pair of side wings which extend from the central section. A first wing terminates in a flange and the other of the side wings terminates in a bifurcated bent arm which includes a pair of fingers which are bent back towards the central section. The clamping section has an arcuate section which terminates in one end in a flange which is complementary to the flange of the first side wing. The flanges are aligned for securing the conduit in the bracket. The arcuate section is terminated at its other end in an adjustable hinge attaching member which has an endmost straight portion and a bent portion intermediate of the straight portion and the arcuate section. The hinge attaching member includes a first pair of notches formed in the straight and a second pair of notches which are formed in the bent portion. The base and the clamping section are hingedly connected together by inserting either the first or the second pair of notches between the fingers of the bifurcated arm of the base section so that alternate positions are provided to accommodate small or large conduit sizes.

---

This invention relates to a conduit bracket, and has as its objective the provision of a novel and inventive device of this general class.

In many electrical cable mast installations, it is necessary either because of safety or weatherproofing considerations or local codes to run electrical cable through vertically disposed conduit. It is the common practice to secure such conduit to a vertical wall through the utilization of spaced U-shaped brackets which include side flanges having openings to permit the passage of screws or other fastening members to fasten the same to the wall. In many instances, a conduit size, such as 2¼ or 2½ inches (outside diameter) is utilized or called for in the electrical codes. In other instances a smaller conduit, with for instance, 1½ inch outside diameter conduit will suffice. Because of this, it has been necessary to manufacture and stock the conventional U-shaped brackets in 1½, 2¼ and 2½ inch sizes as well as other popular sizes. This becomes quite troublesome in the field wherein the installation man is required to carry an adequate supply of all common sizes of brackets.

It is therefore an object of the present invention to provide a conduit bracket which can be utilized to support vertically disposed conduits of a given diameter falling within a reasonable range of outside diameters.

Yet another object of the present invention is to provide a conduit bracket that is simply and economically manufactured, and which can be easily used without complications.

The foregoing as well as other objects of the invention are achieved by providing a conduit bracket which is basically comprised of a U-shaped base and a hinged clamping section that is connectable to the base. The U-shaped base has a slot which permits the passage of a screw or bolt that secures the base to a wall. The base further includes a bifurcated bent arm for receiving the hinged clamping section which possesses at least two pairs of notches. Each of the notch pairs are adapted to receive hingedly the aforesaid bifurcated, bent arm. The hinged clamping section also includes a U-shaped area that terminates in a flange having an opening to permit the passage of a bolt which also passes through a similar flange extending from the U-shaped base, with the aforesaid bolt being utilized for tightening purposes.

In a first modification of the invention, a lengthy bolt extends from the U-shaped base. In yet another embodiment of the present invention, the securing bolt or screw is dispensed with, and instead an insulator is secured to the U-shaped base to provide an assembly which can be secured to a conduit, for purposes of supporting electrical cable with the avoidance of any dangerous shorting tendencies that might develop over a period of time.

Other objects and many of the attendant advantages of this invention will be readily appreciated as the same becomes better understood by reference to the following detailed description when considered in connection with the accompanying drawings wherein:

FIG. 6 is a perspective view of a conduit bracket constituting a second embodiment of the present invention;

FIG. 7 is a sectional view taken along the lines 7—7 of FIG. 6;

FIG. 8 is a perspective view of a conduit bracket constituting a third embodiment of the present invention; and FIG. 9 is a sectional view taken along the lines 9—9 of FIG. 8.

Figure 1:
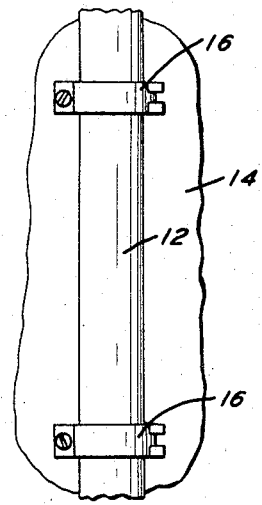
FIG. 1 is an elevational view showing a conduit supported by conduit brackets constructed in accordance with the present invention.

Referring now in greater detail to the various views of the drawing wherein like reference characters are used throughout, there is shown in FIG. 1 a conduit 12 secured to vertical wall 14 by means of metallic or plastic conduit brackets 16 constructed in accordance with the present invention. A first embodiment of conduit bracket 16 is shown in FIGS. 2 to 5 wherein the conduit bracket 16 basically comprises U-shaped base 18 and hinged clamping section 20 that is connectable to the base 18.

Figure 4:
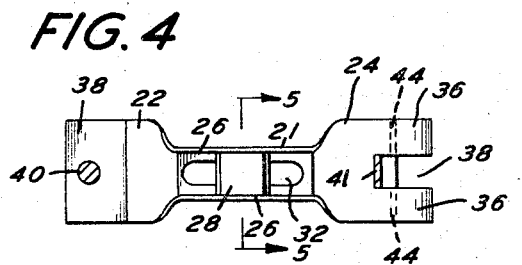
FIG. 4 is a sectional view on a reduced scale taken along the lines 4—4 of FIG. 2.
Figure 5:
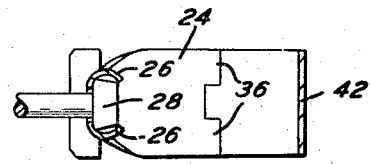
FIG. 5 is a sectional view taken along the lines 5—5 of FIG. 4.

The U-shaped base 18 has a central section 21 from which extends arcuate side wings 22 and 24 (see FIG. 4). The central section 21 also includes bent-over edges 26 which act as a track to hold captive the head 28 of screw 30. The central section 21 also includes a slot 32 which permits lateral adjustment of the screw 30.

Figure 2:
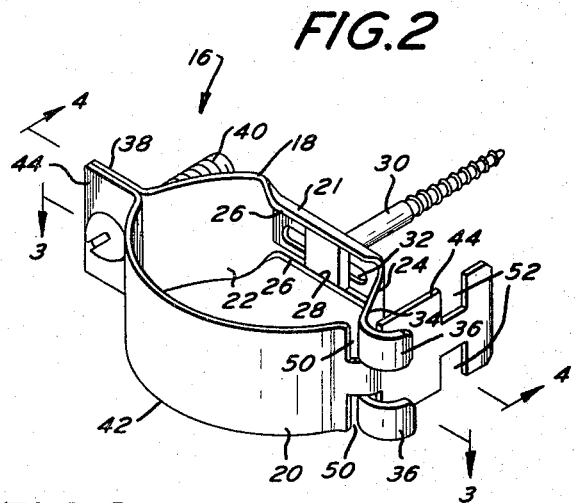
FIG. 2 is a perspective view of a conduit bracket constructed in accordance with a first embodiment of the present invention.

As shown in FIGS. 2 and 4, the side wing 24 terminates in a bifurcated, bent arm 34 which includes base fingers 36, separated by slot 38 with a bend 40 preferably occurring near the base 41 of slot 38. It is to be noted that the fingers 36 are bent back toward the central section 21 in such a way that the free ends of the fingers 36 point in the same direction as the threads of the screw 30. It will be seen that the fingers 36 will be received in pairs of notches provided in hinged clamping section 21 in order that the clamping section 21 may be hingedly secured to the base 18 in at least two positions.

As further shown in FIGS. 2 and 4, the side wing 22 terminates in a flange 38 which permits the passage of bolt 40 for tightening purposes as will be described hereinafter.

The hinged clamping section 20 as best seen in FIG. 2 comprises arcuate section 42 which terminates at one end in flange 44 that is complementary to flange 38 of base 18. As shown in FIG. 2 the flanges 38 and 44 are generally in contact with each other, and both of the flanges possess superimposed openings that permit the passage of the tightening bolt 40.

Figure 3:
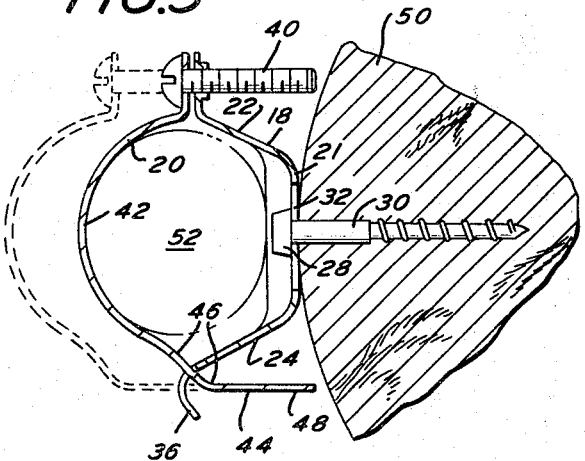
FIG. 3 is a sectional view taken along the lines 3—3 of FIG. 2.

At its other end the arcuate section 42 terminates in adjustable hinge attaching means 44. The means 44, as shown in FIG. 3, includes a bend 46 and a straight run 48. Pairs of notches 50 and 52 are formed in the attaching means in order to receive the fingers 36 in a given position as shown in FIG. 2. It is to be noted that the notches 50 are formed in the hinged attaching means 44 adjacent one of the bends 46, while the notches 52 are formed on the straight run of the hinged attaching means 44. It is contemplated that additional notches may be formed in the hinge attaching means, depending upon the degrees of adjustability desired.

The installation of the conduit bracket is shown in FIG. 3 wherein a screw 30 is employed to attach base 18 to a rounded surface 50. The head 28 of the screw 30 is held captive within the base 18 by means of the bent-over edges 26, and the slot 32 permits the base 18 to be adjusted in a given direction before the final tightening of the screw 30. In making an installation, it may be desired to install all of the bases 18. Then, the conduit 52 is placed within the confines of all of the bases 18. Finally, a hinged clamping section 20 is attached to each base 18 by engaging fingers 36 of the base 18 in one of the pairs of notches in the hinge attaching means 44 of the clamping section 20. Then, the bolt 40 is tightened to complete the installation.

Another embodiment 110 of the present invention is shown in FIGS. 6 and 7 wherein there are used reference numerals similar to those employed in FIG. 2. Thus, the embodiment 110 is comprised of the base 118 and the clamping section 120. The base 118 includes fingers 136 that are received in either of the pairs of notches 150 or 152 of the hinge attaching means 144 with bolt 140 provided for tightening purposes. In the embodiment of FIGS. 6 and 7 the head 128 of long-stemmed bolt 130 is not held captive within the central section 121, and this embodiment of the invention is usable where the restriction of the screw head of FIG. 2 is not desired. The elongated bolt 130 has a threaded tip to receive bolt 146, and a washer 148 may also be provided. The embodiment of FIGS. 6 and 7 may be utilized to secure the conduit bracket 110 to a rather thick wall or panel which has a predrilled hole in order to receive the stem of the bolt 130.

Attention is now called to embodiment 210 of FIGS. 8 and 9 which substitutes an insulator for a screw or a bolt. As shown in FIG. 8 the embodiment 210 comprises U-shaped base 218 and clamping section 220 which are constructed along the lines of base 18 and section 20 of FIG. 2. As shown in FIG. 8, the base 218 includes a central section 221 and side wings 222 and 224. The base 218 also includes fingers 236.

The clamping section 220 includes arcuate section 242 with adjustable hinge attaching means 244 including notch pairs 250 and 252. Flanges 238 and 244 are provided for the adjusting bolt 240.

The embodiment of FIGS. 8 and 9 utilizes an insulator 260 instead of an attaching screw or bolt. It is seen that the adjusting hinge feature of the present invention may be simply added to an existing separate insulator, or it is possible to produce a composite unit comprising the adjustable hinge member and the insulator.

The insulator 260 is comprised of a body section, constructed in the usual manner, with a through opening 264 to permit the passage of a cable or other carrier. The insulator body 262 includes upper and lower grooves 266 in which are positioned the sides 268 of U-shaped strap 270 with elongated stud 272 (FIG. 9) being used to secure the strap 270 to the insulator body 262. As shown in FIG. 9 the strap 268 also includes a bridging section 274 which passes about the central section 221 of the base 218 in order to secure the same to the insulator 260. As further shown in FIG. 9 cushioning means 276 and insulating means 278 are provided in view of the rather fragile nature of the insulator 260.

The device of FIGS. 8 and 9 is utilized to support an electrically conductive member with the hinged attachment means being used for purposes of securement to a conductive support, such as a pipe or a conduit.

The device of FIGS. 2 to 5 is simply installed by working the screw 30 into a base or other support, with the captive nature of the head 28 being employed in such a way that greater leverage is obtained, because the screw 30 can be worked into the base by a grasping of either side wings 22 or 24. Once the base has been worked into position, the clamping section is secured in either of the notch pairs 50 or 52, depending upon the size of conduit which is to be supported by the conduit bracket. It is to be noted that the screw 30 is slidable laterally in the slot 32 for alignment purposes.

The device of FIGS. 6 and 7 is similarly used, but here the head of the bolt 130 is not held captive, and instead the elongated bolt may be secured through the walls of a home, using a predrilled hole.

Finally, the device of FIGS. 8 and 9 is utilized by securing the hinged members to a conduit, pipe or other support, and in this way a conductive member may be led through the opening in insulator 260 and thereby supported.

It is seen that the present invention affords a considerable degree of adjustability and design versatility, while at the same time avoiding the necessity of keeping different sizes of conduit brackets in stock or carrying different sizes along in the field. It is, of course, contemplated that more than two notch pairs may be employed where a greater degree of versatility is desired.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A conduit bracket for securing a conduit to a wall comprising a U-shaped base, a clamping section pivotably connected to said base and a securing member extending from said base, said base comprising a central section having a slotted opening for lateral adjustment of said securing member and a pair of side wings extending from said central section, a first of said side wings terminating in a flange, the other of said side wings terminating in a bifurcated bent arm which includes a pair of fingers which are bent back towards the central section, said clamping section having an arcuate section which terminates at one end in a flange which is complementary to the flange of said first side wing, said flanges being aligned for securing said conduit in said bracket, said arcuate section being terminated at its other end in an adjustable hinge attaching member having an endmost straight portion and a bent portion intermediate of said straight portion and said arcuate section, said hinge attaching member including a first pair of notches formed in said straight portion and a second pair of notches formed in said bent portion, said base and said clamping section being hingedly connectable together by inserting either said first or said second pair of notches between said fingers of said bifurcated arm of said base section whereby alternate positions are provided to accommodate small or large conduit sizes.

2. The invention of claim 1 wherein said securing member is captively secured in said slotted opening for securing said base section to said wall.

3. The invention of claim 1 wherein said flanges of said hinged clamping section and said base section have aligned openings for permitting the passage of a tightening bolt.

4. The invention of claim 2 wherein said securing member is a threaded member and rotation of said base section about the axis of said securing member enables securement to said wall.

5. The invention of claim 1 wherein said securing member is an elongated bolt for securing said conduit to a thick wall.

6. The invention of claim 1 wherein said securing member is an insulator, said insulator being secured to said base by means of a strip extending from said insulator.

References Cited

UNITED STATES PATENTS

| 2,550,001 | 4/1951 | Button | 248—70 XR |
| 2,645,831 | 7/1953 | Staaf | 248—50 XR |

FOREIGN PATENTS

| 688,173 | 1/1930 | France. |
| 769,227 | 6/1934 | France. |
| 827,170 | 2/1960 | Great Britain. |

ROY D. FRAZIER, *Primary Examiner.*

J. F. FOSS, *Assistant Examiner.*